United States Patent [19]
Herot

[11] Patent Number: 5,837,944
[45] Date of Patent: *Nov. 17, 1998

[54] BEVERAGE MEASURING SYSTEM

[76] Inventor: Michael R. Herot, 9 Oaklyn Ave., Norristown, Pa. 19403

[ * ] Notice: This patent issued on a continued prosecution application filed under 37 CFR 1.53(d), and is subject to the twenty year patent term provisions of 35 U.S.C. 154(a)(2).

[21] Appl. No.: 699,415

[22] Filed: Aug. 19, 1996

[51] Int. Cl.⁶ .......................... G01G 19/22; G01G 19/00; G01K 1/08
[52] U.S. Cl. .................. 177/245; 177/25.14; 177/25.13; 374/141; 374/142; 73/296
[58] Field of Search .............................. 177/25.13, 25.14, 177/25.19, 245; 222/400.7, 23, 77; 174/71 R, 72 R; 99/275; 374/141, 142, 147, 148, 150, 179; 73/296

[56] References Cited

U.S. PATENT DOCUMENTS

| H381 | 12/1987 | Pounds et al. ........................... 374/142 |
| 2,236,243 | 4/1941 | Cornelius ................................. 374/141 |
| 4,091,672 | 5/1978 | Amrine et al. ......................... 73/343 R |
| 4,138,890 | 2/1979 | Brown ...................................... 374/148 |
| 4,484,695 | 11/1984 | Fallon et al. .............................. 222/23 |
| 5,007,560 | 4/1991 | Sassak ......................................... 222/1 |
| 5,199,790 | 4/1993 | Pawelzik et al. ........................ 374/147 |

FOREIGN PATENT DOCUMENTS

| 3511224 | 10/1986 | European Pat. Off. ................. 73/296 |
| 3511224 | 10/1986 | Germany .................................. 73/296 |

*Primary Examiner*—Renee S. Luebke
*Assistant Examiner*—Anh Mai

[57] ABSTRACT

A new Beverage Measuring System for simultaneously measuring and displaying the temperature and the amount of beverage remaining within a conventional beverage keg thereby eliminating guessing how much beverage remains in said beverage keg. The inventive device includes an electronic scale where a beverage keg is positioned on the cornice of said electronic scale, a beverage thermometer connected within the beverage dispensing hose or the scale, and a digital display electronically connected to said electronic scale and the beverage thermometer thereby displaying the temperature of the beverage and the number of servings of beverage remaining within the beverage keg.

4 Claims, 3 Drawing Sheets

BEVERAGE MEASURING SYSTEM

BACKGROUND OF THE INVENTION

1. Field of the Invention

The present invention relates to Beverage Dispensing Devices and more particularly pertains to a new Beverage Measuring System for simultaneously measuring and displaying the temperature and the amount of beverage remaining within a conventional beverage keg thereby eliminating guessing how much beverage remains in said beverage keg.

2. Description of the Prior Art

The use of Beverage Dispensing Devices is known in the prior art. More specifically, Beverage Dispensing Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Beverage Dispensing Devices include U.S. Pat. No. 4,474,255; U.S. Pat. No. 5,007,560; U.S. Pat. No. 4,997,012; U.S. Pat. No. 4,187,957; U.S. Pat. No. 5,179,552 and Design U.S. Pat. No. 273,665.

While these devices fulfill their respective, particular objectives and requirements, the aforementioned patents do not disclose a new Beverage Measuring System. The inventive device includes an electronic scale where a beverage keg is positioned on the cornice of said electronic scale, a beverage thermometer connected within the beverage dispensing hose or the scale, and a digital display electronically connected to said electronic scale and the beverage thermometer thereby displaying the temperature of the beverage and the number of servings of beverage remaining within the beverage keg.

In these respects, the Beverage Measuring System according to the present invention substantially departs from the conventional concepts and designs of the prior art, and in so doing provides an apparatus primarily developed for the purpose of simultaneously measuring and displaying the temperature and the amount of beverage remaining within a conventional beverage keg thereby eliminating guessing how much beverage remains in said beverage keg.

SUMMARY OF THE INVENTION

In view of the foregoing disadvantages inherent in the known types of Beverage Dispensing Devices now present in the prior art, the present invention provides a new Beverage Measuring System construction wherein the same can be utilized for simultaneously measuring and displaying the temperature and the amount of beverage remaining within a conventional beverage keg thereby eliminating guessing how much beverage remains in said beverage keg.

The general purpose of the present invention, which will be described subsequently in greater detail, is to provide a new Beverage Measuring System apparatus and method which has many of the advantages of the Beverage Dispensing Devices mentioned heretofore and many novel features that result in a new Beverage Measuring System which is not anticipated, rendered obvious, suggested, or even implied by any of the prior art Beverage Dispensing Devices, either alone or in any combination thereof.

To attain this, the present invention generally comprises an electronic scale where a beverage keg is positioned on the cornice of said electronic scale, a beverage thermometer connected within the beverage dispensing hose or the scale, and a digital display electronically connected to said electronic scale and the beverage thermometer thereby displaying the temperature of the beverage and the number of servings of beverage remaining within the beverage keg.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Beverage Measuring System apparatus and method which has many of the advantages of the Beverage Dispensing Devices mentioned heretofore and many novel features that result in a new Beverage Measuring System which is not anticipated, rendered obvious, suggested, or even implied by any of the prior art Beverage Dispensing Devices, either alone or in any combination thereof.

It is another object of the present invention to provide a new Beverage Measuring System which may be easily and efficiently manufactured and marketed.

It is a further object of the present invention to provide a new Beverage Measuring System which is of a durable and reliable construction.

An even further object of the present invention is to provide a new Beverage Measuring System which is susceptible of a low cost of manufacture with regard to both materials and labor, and which accordingly is then susceptible of low prices of sale to the consuming public, thereby making such Beverage Measuring System economically available to the buying public.

Still yet another object of the present invention is to provide a new Beverage Measuring System which provides in the apparatuses and methods of the prior art some of the advantages thereof, while simultaneously overcoming some of the disadvantages normally associated therewith.

Still another object of the present invention is to provide a new Beverage Measuring System for simultaneously measuring and displaying the temperature and the amount of beverage remaining within a conventional beverage keg thereby eliminating guessing how much beverage remains in said beverage keg.

Yet another object of the present invention is to provide a new Beverage Measuring System which includes an electronic scale where a beverage keg is positioned on the cornice of said electronic scale, a beverage thermometer connected within the beverage dispensing hose or the scale, and a digital display electronically connected to said electronic scale and the beverage thermometer thereby displaying the temperature of the beverage and the number of servings of beverage remaining within the beverage keg.

Still yet another object of the present invention is to provide a new Beverage Measuring System that eliminates the need to guess how much beverage is remaining with a beverage keg.

Even still another object of the present invention is to provide a new Beverage Measuring System that prevents the user from accidentally running out of beverage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
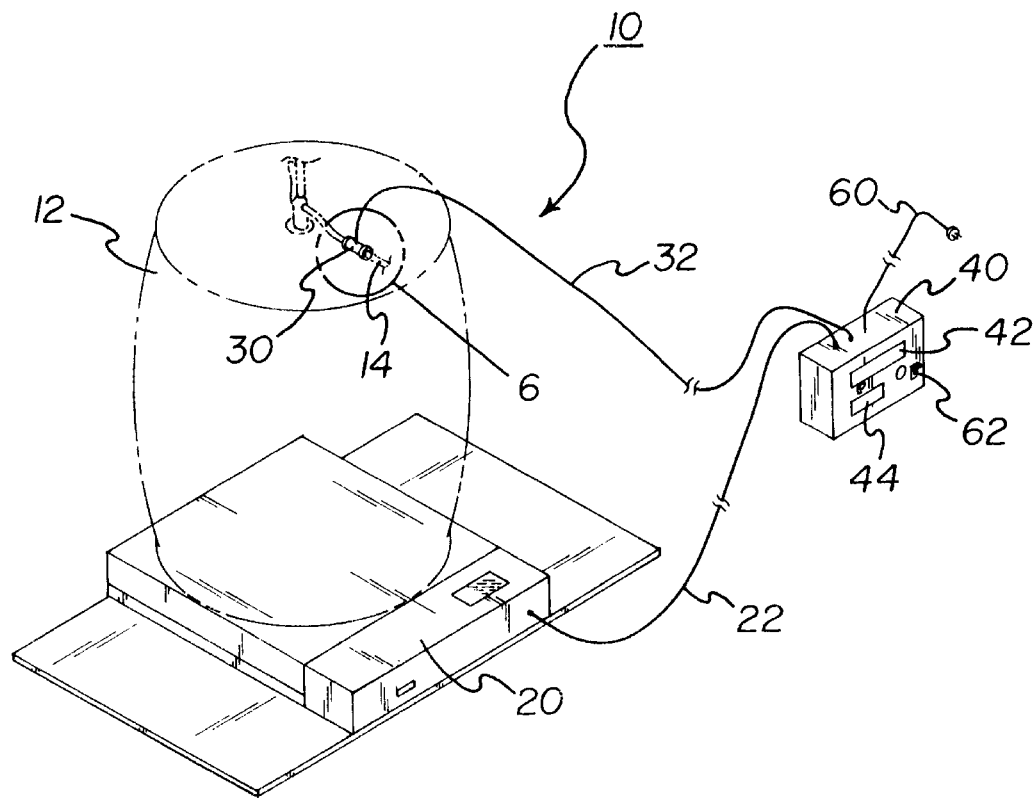
FIG. 1 is a perspective view of a new Beverage Measuring System according to the present invention.
Figure 2:
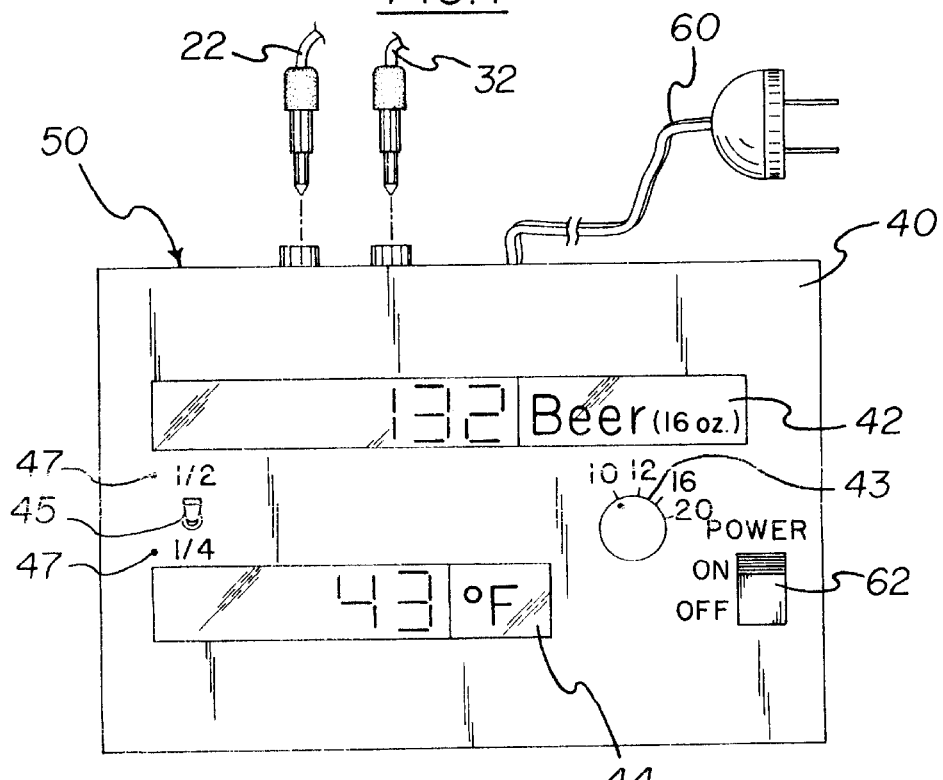
FIG. 2 is a front view of the digital display housing.
Figure 3:
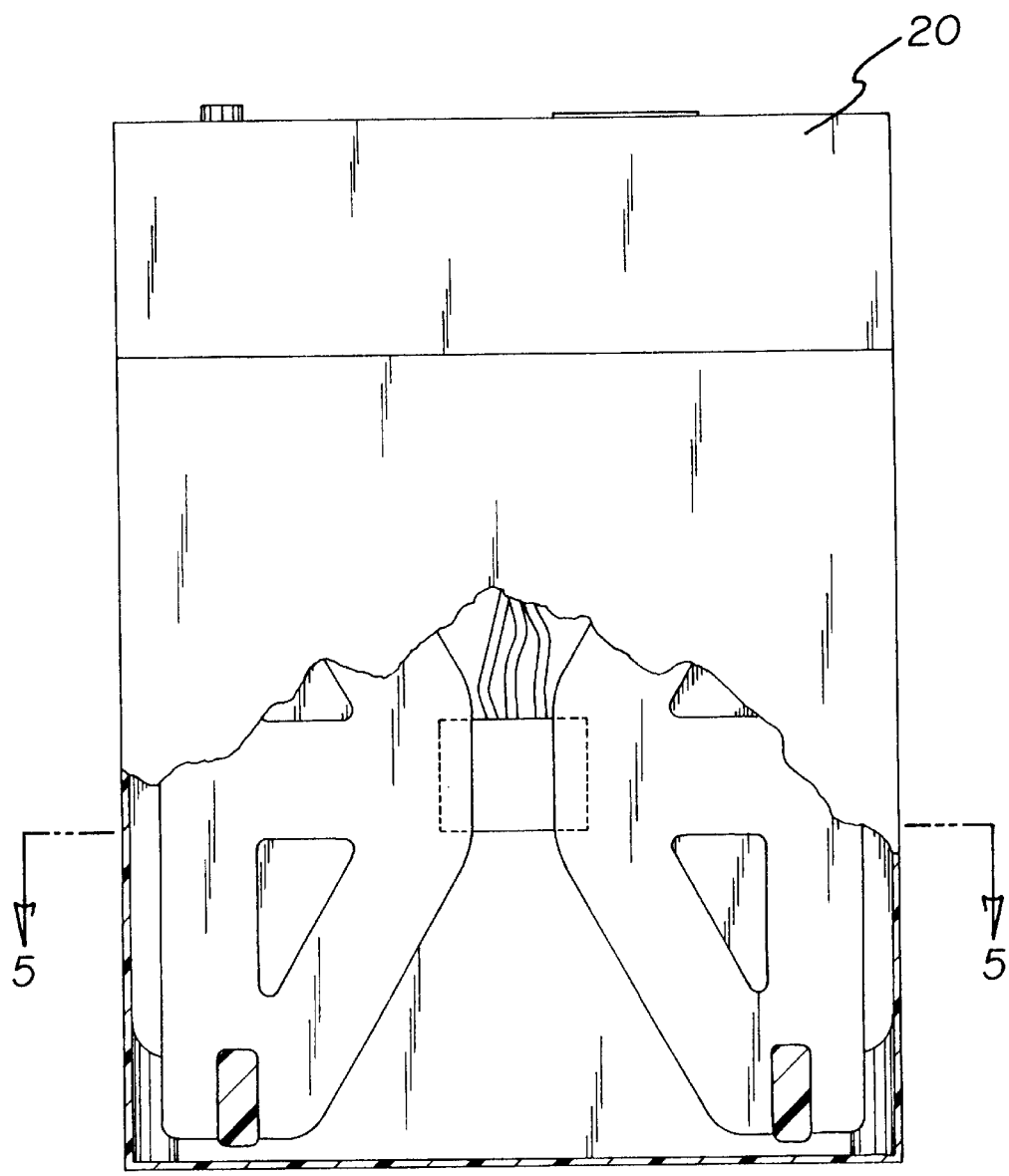
FIG. 3 is a top cut away view of the electronic scale.
Figure 4:
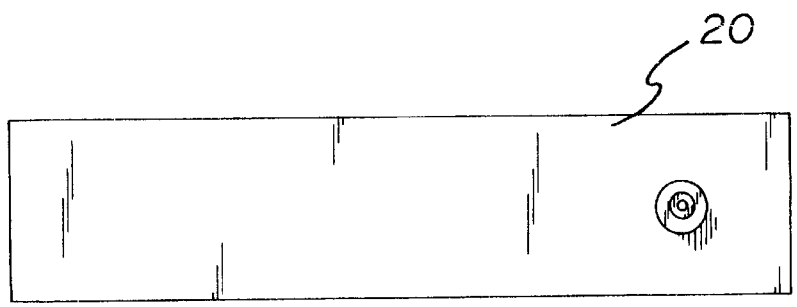
FIG. 4 is a front view of the electronic scale.
Figure 5:
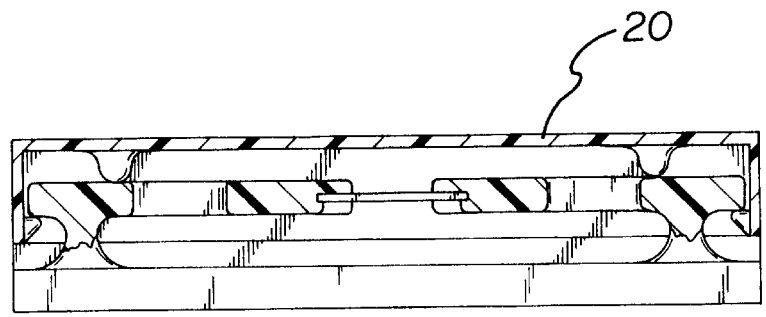
FIG. 5 is a cross sectional view taken along line 5—5 of FIG. 3.
Figure 6:
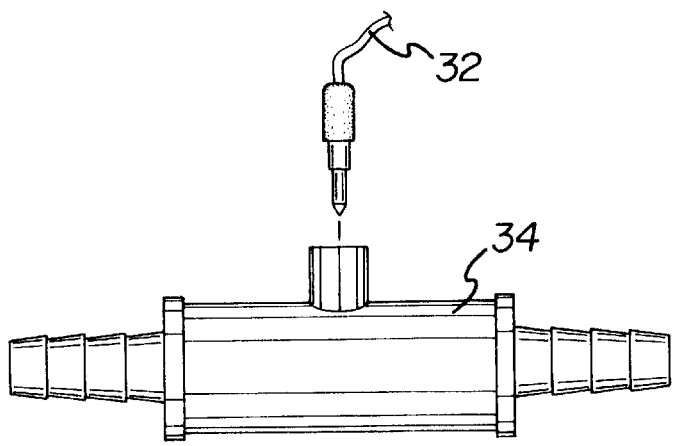
FIG. 6 is a top view of the T-coupler containing the beverage thermometer when used in series with the dispensing hosing.
Figure 7:
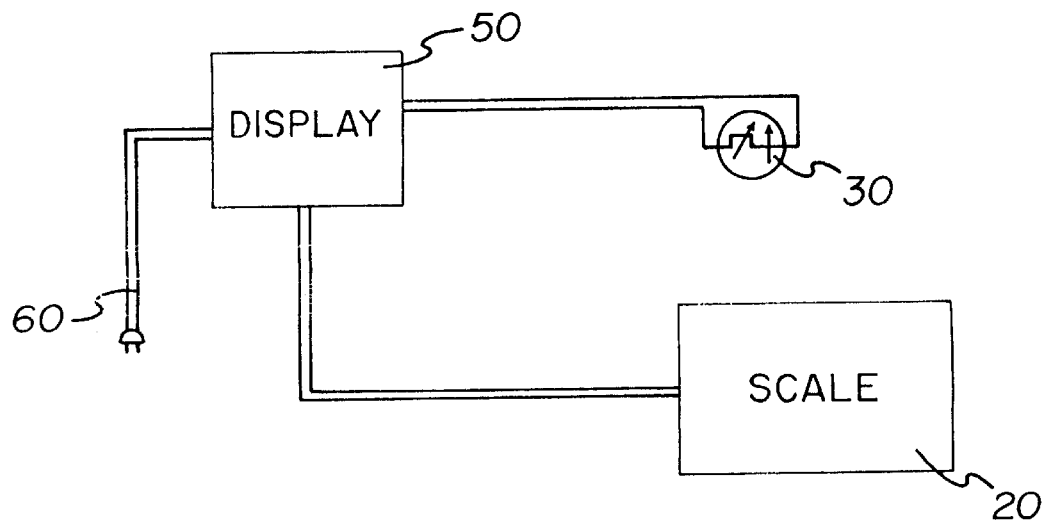
FIG. 7 is a schematic diagram of the present invention.

With reference now to the drawings, and in particular to FIGS. 1 through 7 thereof, a new Beverage Measuring System embodying the principles and concepts of the present invention and generally designated by the reference numeral 10 will be described.

More specifically, it will be noted that the Beverage Measuring System 10 comprises an electronic scale 20 with a beverage keg 12 containing a beverage positioned on the electronic scale 20, a T-coupler 34 positioned within a beverage dispensing hose 14 which further includes a beverage thermometer 30 which measures the temperature of the beverage within the beverage keg 12, an digital display 50 electronically connected to the electronic scale 20 and the beverage thermometer 30, and a power cable 60 electronically connected to the digital display 50.

As best illustrated in FIGS. 1 through 7, it can be shown that the digital display 50 includes an digital display housing 40. A servings remaining display 42 is electronically connected to the electronic scale 20 by a scale connecting cable 22. The servings remaining display 42 adjusts for the weight of the beverage keg 12 thereby displaying a total number of servings of beverage remaining within the beverage keg 12. A temperature display 44 is electronically connected to the beverage thermometer 30 by a thermometer cable 32 where the temperature display 44 discloses the temperature in either Celsius or Fahrenheit. The digital display 50 includes a power switch 62 mounted to the digital display housing 40 and electronically connected mesial the power cable 60 and the digital display 50 thereby controlling the power to the digital display 50. The servings remaining display 42 also displays the number of servings cups dispensed from the beverage keg 12 in a selected serving size of 10, 12, 16, or 20 ounce servings using a first selection switch 43. A second selection switch 45 is used to select between different sizes of beverage kegs currently available which can be adjusted accurately to the empty weight of the beverage keg 12 by a calibration adjuster 47.

In use, the user positions the beverage keg 12 upon the electronic scale 20. The electronic scale 20 determines the total weight of the beverage keg 12 and electronically transmits the total weight to the servings remaining display 42 which converts the total weight into the total number of servings remaining within the beverage keg 12 taking into account and adjusting for the beverage keg's 12 empty weight. The servings remaining display 42 thereafter displays the total number of servings cups remaining. The beverage thermometer 30 determines the temperature of the beverage within the beverage keg 12 and electronically transmits the temperature to the temperature display 44 which displays the temperature in either Celsius or Fahrenheit.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A beverage measuring system comprising:
   an electronic scale with a beverage keg containing a beverage positioned on the electronic scale;
   a beverage dispensing hose for coupling to a opening on the beverage keg;
   a T-coupler positioned in the beverage dispensing hose,
   a beverage thermometer inserted in the T-coupler for contacting the beverage as the beverage flows through the beverage dispensing hose for measuring the temperature of the beverage within the beverage dispensing hose as the beverage is dispensed through the beverage dispensing hose;

a digital display means electronically connected to the electronic scale and the beverage thermometer, the digital display means being for displaying the temperature of the beverage and the amount of beverage remaining in the beverage keg; and a power cable electronically connected to the digital display;

wherein the digital display means includes:

a digital display housing;

a servings remaining display located in the digital display housing for processing data received by the servings remaining display and calculating and generating a visible output indicating the number of servings remaining in the beverage keg, wherein the servings remaining display is electronically connected to the electronic scale by a scale connecting cable, wherein the servings remaining display is adapted to adjust for the weight of the particular beverage keg size thereby displaying a total number of servings of beverage in fluid ounces remaining within the beverage keg;

a first selection switch located in the digital display housing and being electronically connected to the servings remaining display, wherein the first selection switch is manually adjustable to select a desired serving size for adjusting the calculation by the servings remaining display to compensate for the size of the servings to be drawn from the beverage keg;

a second selection switch located in the digital display housing and being electronically connected to the servings remaining display, wherein the second selection switch is manually adjustable to select the particular size of the beverage keg placed on the electronic scale for adjusting the calculation by the servings remaining display to compensate for the weight of various beverage keg sizes; and a temperature display located in the digital display housing for processing data received by the servings remaining display and calculating and generating a visible output indicating the temperature of the beverage in the beverage dispensing hose, wherein said temperature display is electronically connected to the beverage thermometer by a thermometer cable and wherein the temperature display is adapted to disclose the temperature of the beverage in both Celsius and Fahrenheit degree measurements.

2. The beverage measuring system of claim 1, wherein the digital display includes a power switch mounted to the digital display housing and electronically connected between the power cable and the digital display for controlling the power to the digital display.

3. The beverage measuring system of claim 1, wherein the servings remaining display is adapted to calculate and display the number of servings dispensed from the beverage keg based on the desired serving size.

4. A beverage measuring system for measuring the amount of a beverage within a beverage keg, the beverage measuring system comprising:

an electronic scale adapted for placement under the beverage keg;

an electronic display means for calculating and displaying the amount of beverage remaining in the beverage keg and the temperature of the dispensed beverage;

a beverage dispensing hose adapted for dispensing the beverage from the beverage keg;

a T-coupler interposed in the beverage dispensing hose;

a beverage thermometer inserted into said T-coupler such that the dispensed beverage contacts the beverage thermometer for measuring the temperature of the beverage within the beverage dispensing hose, said beverage thermometer further being in communication with said electronic display means; and a power cable electronically connected to the digital display;

wherein the electronic display means includes:

a digital display housing;

a servings remaining display located in the digital display housing for processing signals received by the servings remaining display and calculating and generating a visible output indicating the number of servings remaining in the beverage keg, wherein the servings remaining display is electronically connected to the electronic scale by a scale connecting cable, wherein the servings remaining display is adapted to adjust for the weight of the particular beverage keg size thereby displaying a total number of servings of beverage in fluid ounces remaining within the beverage keg;

a first selection switch located in the digital display housing and being electronically connected to the servings remaining display, wherein the first selection switch is manually adjustable to select a desired serving size for adjusting the calculation by the servings remaining display to compensate for the size of the servings to be drawn from the beverage keg;

a second selection switch located in the digital display housing and being electronically connected to the servings remaining display, wherein the second selection switch is manually adjustable to select the particular size of the beverage keg placed on the electronic scale for adjusting the calculation by the servings remaining display to compensate for the weight of various beverage keg sizes; and a temperature display located in the digital display housing for processing data received by the servings remaining display and calculating and generating a visible output indicating the temperature of the beverage in the beverage dispensing hose, wherein said temperature display is electronically connected to the beverage thermometer by a thermometer cable and wherein the temperature display is adapted to disclose the temperature of the beverage in both Celsius and Fahrenheit degree measurements.

* * * * *